United States Patent
Mitamura

(10) Patent No.: US 8,649,097 B2
(45) Date of Patent: Feb. 11, 2014

(54) METHOD OF CONTROLLING INCLINATION ANGLE OF FABRY-PEROT TUNABLE FILTERS

(75) Inventor: Motohiro Mitamura, Mitaka (JP)

(73) Assignee: Olympus Corporation, Tokyo (JP)

( * ) Notice: Subject to any disclaimer, the term of this patent is extended or adjusted under 35 U.S.C. 154(b) by 578 days.

(21) Appl. No.: 12/729,405

(22) Filed: Mar. 23, 2010

(65) Prior Publication Data
US 2010/0246010 A1    Sep. 30, 2010

(30) Foreign Application Priority Data

Mar. 24, 2009    (JP) .................................. 2009-072031

(51) Int. Cl.
*G02B 27/00*    (2006.01)

(52) U.S. Cl.
USPC ....................................................... 359/579

(58) Field of Classification Search
USPC ......................................... 359/260, 578, 579
See application file for complete search history.

(56) References Cited

FOREIGN PATENT DOCUMENTS

| JP | 4-098211 | 3/1992 |
|---|---|---|
| JP | 3039969 | 5/2000 |

*Primary Examiner* — Alessandro Amari
(74) *Attorney, Agent, or Firm* — Scully, Scott, Murphy & Presser, P.C.

(57) ABSTRACT

Fabry-Perot tunable filters is provided with a first fixed semi-transparent mirror and a second movable semitransparent mirror arranged against each other, and piezoelectric elements more than three arranged at an equi-interval on the second movable semitransparent mirror to change a space between the first and second semitransparent mirrors. The second movable semitransparent mirror is adapted to be rotated by using as a pivot an imaginary axis toward which each length of perpendiculars let fall from each of the piezoelectric elements on a plane parallel to the second movable semitransparent mirror and including the imaginary axis connected between arbitrary two points of each middle point between the adjacent piezoelectric elements is equal each other.

2 Claims, 1 Drawing Sheet

METHOD OF CONTROLLING INCLINATION ANGLE OF FABRY-PEROT TUNABLE FILTERS

This application claims benefits of Japanese Patent Application No. 2009-72031 filed in Japan on Mar. 24, 2009, the contents of which are hereby incorporated by reference.

BACKGROUND OF THE INVENTION

1. Field of the Invention

The present invention relates to a method of controlling inclination angle of Fabry-Perot tunable filters.

2. Description of the Related Art

The Fabry-Perot tunable filter is constituted by arranging opposite a semitransparent mirror to be used as a fixed mirror, and a semitransparent mirror to be used as a movable mirror. And, a plural piezoelectric element is arranged with same interval on the semitransparent mirror to be used as the movable mirror, the inclination angle of the movable mirror is adapted to be able to change by making expand and contract the piezoelectric elements with the change of voltage.

This is for the reason that it is necessary to adjust so that the surface of the fixed mirror and the surface of the movable mirror become completely parallel state by controlling the inclination angle of the movable mirror, when the fixed mirror and the movable mirror are not assembled under the exactly parallel state. In case that the inclination angle of the movable mirror is to be changed, the amount of expansion and contraction of a plural piezoelectric element is adjusted suitably so that the movable mirror is rotated around a predetermined imaginary axis, thereby the movable mirror is adjusted so as to incline by a desired angle in the desired direction.

For example, in Japanese Patent No. 3039969, the control surface of Fabry-Perot resonator is supported by piezoelectric elements more than three, parallelism between the fixed surface and the control surface is adjusted by rotating the control surface to two axes met at right angles with each other on the control surface parallel to the fixed surface according to a displacement of the piezoelectric elements.

In this Japanese Patent No. 3039969, three piezoelectric elements are arranged so as to form a regular triangle as a top point the first piezoelectric element, at 120° interval, that is, equal space to the semitransparent mirror, and one of the two axes met at right angles, that is, Y axis is the first standard axis parallel to the semitransparent mirror and passing through the center of the semitransparent mirror and the attachment position of the first piezoelectric element, the other, that is, X axis is the second axis parallel to the semitransparent mirror, passing through the center of the semitransparent mirror and perpendicular to the Y axis. That is to say, the X axis passes through the center of gravity of three piezoelectric elements and is parallel to the line combining the second piezoelectric element and the third piezoelectric element.

And, in this Japanese Patent No. 3039969, when the fixed mirror and the movable mirror are not assembled with exactly parallel to each other, the movable mirror is adjusted so as to become parallel state to the fixed mirror by controlling its inclination.

SUMMARY OF THE INVENTION

A method of controlling inclination angle of Fabry-Perot tunable filters according to the present invention is characterized in that a first semitransparent mirror which is a fixed mirror (a fixed first semitransparent mirror), a second semitransparent mirror which is a movable mirror (a movable second semitransparent mirror) arranged against the first semitransparent mirror, and piezoelectric elements more than three arranged at an equi-interval on the second semitransparent mirror are provided, and the second semitransparent mirror is adapted to be rotated as a pivot an imaginary axis toward which each length of perpendiculars let fall from each of the piezoelectric elements on a plane parallel to the second semitransparent mirror and including the imaginary axis connected between arbitrary two points of each middle point between the adjacent piezoelectric elements is equal each other.

Further, a method of controlling inclination angle of Fabry-Perot tunable filters of the present invention is characterized in that all of the imaginary axes used for control of the inclination angle cross at one point.

According to the present invention, the stress to the movable mirror is dispersed equally, the stress is reduced, and the connecting portion of the movable mirror or the movable mirror and piezoelectric elements is hard to break.

These and other features and advantages of the present invention will become from the detailed description of the preferred embodiments when taken in conjunction with the accompanying drawings.

DETAILED DESCRIPTION OF THE PREFERRED EMBODIMENTS

First, prior to the description of embodiments, the functions and merits of the present invention will be described.

In a method of controlling the inclination angle of Fabry-Perot tunable filters of the present invention, a first semitransparent mirror which is a fixed mirror, a second semitransparent mirror which is a movable mirror arranged against the first semitransparent mirror, and piezoelectric elements more than three arranged at an equi-interval on the second semitransparent mirror are provided. The two semitransparent mirrors are located so as to face each other, one of the semitransparent mirrors is fixed and the other is movable by a piezoelectric element.

And, the second semitransparent mirror is controlled so as to be rotated as a pivot an imaginary axis toward which each length of perpendiculars let fall from each of the piezoelectric elements on a plane parallel to the second semitransparent mirror and including the imaginary axis connected between arbitrary two points of each middle point between the adjacent piezoelectric elements is equal each other.

As each distance from each piezoelectric element to the imaginary axis is equal, the inclination of the movable mirror results in being controlled as a pivot the imaginary axis by making the amount of expansion and contraction the same, at the expansion side and the contraction side of the piezoelectric element from the imaginary axis. Accordingly, the stress which acts on the movable mirror becomes equal at the expansion side and the contraction side of the piezoelectric element, the stress is dispersed equally over the movable mirror and lessen, and the connecting portion of the movable mirror or between the movable mirror and piezoelectric element becomes hard to break down.

Further, plural imaginary axes used for controlling the inclination angle of the movable mirror are crossed at one point. As each piezoelectric element is arranged at an equal distance from each pivot by taking such formation, the stress which acts on the movable mirror by a displacement of each piezoelectric element can be dispersed equally when the movable mirror is rotated, and therefore, the breakage of the movable mirror by the concentration of stress can be prevented.

Embodiment 1

Next, a method of controlling inclination angle of Fabry-Perot tunable filters according to the present invention will be described in case that three piezoelectric elements are used, referring to FIGS. 1 and 2.

Figure 1:
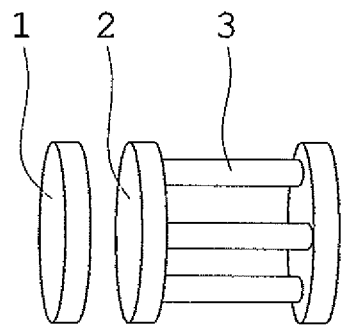
FIG. 1 is a perspective view showing one example of Fabry-Perot tunable filter which is used in the present invention.
Figure 2:
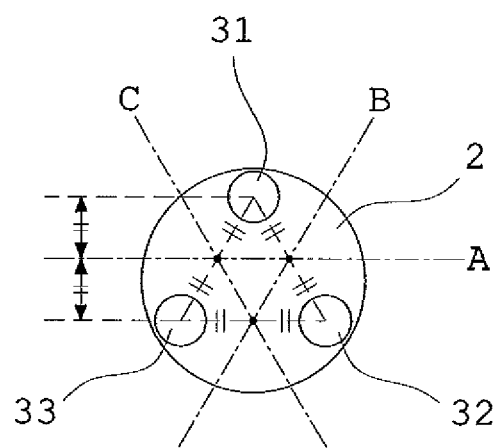
FIG. 2 is an explanatory view of a case using three piezoelectric elements in relation to a method of controlling the inclination angle of Fabry-Perot tunable filter of the present invention.

First, an example of Fabry-Perot tunable filter is shown in FIG. 1. The Fabry-Perot tunable filter, as shown in FIG. 1, comprises a first semitransparent mirror 1 which is a fixed mirror, a second semitransparent mirror 2 which is a movable mirror arranged against the first semitransparent mirror 1 parallel thereto, and three piezoelectric elements 3 which support the second semitransparent mirror 2. And, the three piezoelectric elements 3 are arranged at an equi-interval on the outer peripheral portion of the second semitransparent mirror 2.

Further, the piezoelectric element 3 is used as an actuator. In the following, an example in which three piezoelectric elements 31, 32 and 33 arranged at an equi-interval (120° interval) are used as the actuators as shown in FIG. 2, will be described.

The piezoelectric elements 31, 32 and 33 vary their length by imposing a voltage, whereby the distance between the first semitransparent mirror 1 which is the fixed mirror and the sec- and semitransparent mirror 2 which is the movable mirror is varied. Angle of the second semitransparent mirror 2 to the first semitransparent mirror 1 is also varied by differentiating each displacement amount of three piezoelectric elements 31, 32 and 33. Accordingly, the distance and angle between the first semitransparent mirror 1 which is the fixed mirror and the second semitransparent mirror 2 which is the movable mirror result in being controlled by controlling the displacements of three piezoelectric elements 31, 32 and 33.

Next, a method of controlling inclination angle according to the present invention about the Fabry-Perot tunable filter constituted as described above will be described by referring to FIG. 2.

The second semitransparent mirror 2 which is a movable mirror is made so as to be rotated as a pivot an imaginary axis toward which each length of perpendiculars let fall from each of the piezoelectric elements on a plane parallel to the second semitransparent mirror and including the imaginary axis connected between arbitrary two points of each middle point between the adjacent piezoelectric elements is equal each other.

First, a line connected between the middle point between the piezoelectric element 31 and the piezoelectric element 32 and the middle point between the piezoelectric element 31 and the piezoelectric element 33 is named as an imaginary axis. As the length of perpendicular let fall from the piezoelectric element 31 toward this imaginary axis, the length of perpendicular let fall from the piezoelectric element 32 toward this imaginary axis, and the length of perpendicular let fall from the piezoelectric element 33 are equal each other on a plane including this imaginary axis, this imaginary axis is designated as a rotary axis A.

Similarly, a line connected between the middle point between the piezoelectric element 32 and the piezoelectric element 31 and the middle point between the piezoelectric element 32 and the piezoelectric element 33 is named as an imaginary axis. As the length of perpendicular let fall from the piezoelectric element 31 toward the imaginary axis, the length of perpendicular let fall from the piezoelectric element 32 toward the imaginary axis, and the length of perpendicular let fall from the piezoelectric element 33 are equal each other on a plane including this imaginary axis, this imaginary axis is designated as a rotary axis B.

Further, a line connected between the middle point between the piezoelectric element 33 and the piezoelectric element 32 and the middle point between the piezoelectric element 33 and the piezoelectric element 31 is named as an imaginary axis. As the length of perpendicular let fall from the piezoelectric element 31 toward this imaginary axis, the length of perpendicular let fall from the piezoelectric element 32 toward the imaginary axis, and the length of perpendicular let fall from the piezoelectric element 33 are equal each other on a plane including this imaginary axis, this imaginary axis is designated as a rotary axis C.

And, the inclination angle of the second semitransparent mirror 2 is controlled as pivots the rotary axes A, B and C, respectively.

First, when the second semitransparent mirror 2 is to be rotated around the rotary axis A, a voltage is imposed to the piezoelectric elements so that the piezoelectric element 31 and the piezoelectric elements 32, 33 are displaced to each other by an equal distance to the reverse direction. Whereby, the second semitransparent mirror 2 is rotated around the rotary axis A so that, for example, the piezoelectric element 31 side is moved to the backward direction of document plane, and the piezoelectric element 32 side and the piezoelectric element 33 side are moved to the frontward direction of the document plane, respectively.

Likewise, a voltage is imposed to the piezoelectric elements so that the piezoelectric element 32 and the piezoelectric elements 31, 33 are displaced to each other by an equal distance to the reverse direction around the rotary axis B. Whereby, the second semitransparent mirror 2 is rotated around the rotary axis B.

Also, a voltage is imposed to the piezoelectric elements so that the piezoelectric element 33 and the piezoelectric elements 31, 32 are displaced to each other by an equal distance to the reverse direction around the rotary axis C. Whereby, the second semitransparent mirror 2 is rotated around the rotary axis C.

The inclination angle of the second semitransparent mirror 2 which is a movable mirror to the first semitransparent mirror 1 which is a fixed mirror can be controlled by rotating the second semitransparent mirror 2 as described above.

It becomes possible to perform the control of inclination angle of the movable mirror to the fixed mirror so as not to occur an inclination of the stress acting on the movable mirror by dispersing equally the stress acting to the second semitransparent mirror 2 which is the movable mirror by displacements of the piezoelectric elements 31, 32 and 33, by constituting the Fabry-Perot tunable filter as described above.

Embodiment 2

Next, Fabry-Perot tunable filter including four piezoelectric elements will be described below.

Figure 3:
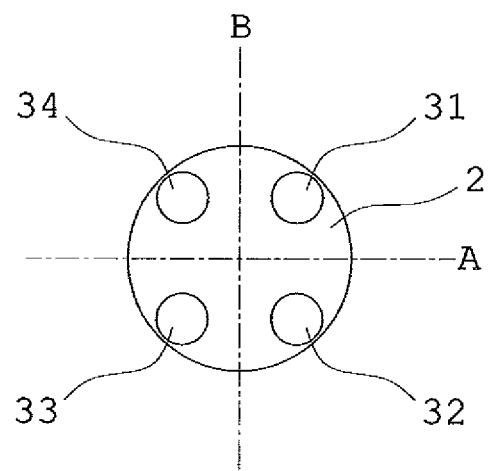
FIG. 3 is an explanatory view of a case using four piezoelectric elements in relation to a method of controlling the inclination angle of Fabry-Perot tunable filter of the present invention.

As shown in FIG. 3, four piezoelectric elements 31, 32, 33 and 34 are arranged with an equal spacing on the peripheral portion of the second semitransparent mirror 2 which is used as a movable mirror.

Next, a method of controlling inclination angle of the present invention will be described by referring to FIG. 3 about Fabry-Perot tunable filter constituted like this.

The second semitransparent mirror 2 which is used as a movable mirror is made so as to be rotated by using as a pivot an imaginary axis toward which each length of perpendiculars let fall from each of the piezoelectric elements on a plane including the imaginary axis connected between arbitrary two points of each middle point between the adjacent piezoelectric elements is equal each other.

First, a line connected between the middle point between the piezoelectric element 31 and the piezoelectric element 32 and the middle point between the piezoelectric element 33 and the piezoelectric element 34 is named as an imaginary axis. As the length of perpendicular let fall from the piezoelectric element 31 toward this imaginary axis, the length of perpendicular let fall from the piezoelectric element 32 toward this imaginary axis, the length of perpendicular let fall from the piezoelectric element 33 toward the imaginary axis, and the length of perpendicular let fall from the piezoelectric element 34 toward the imaginary axis are equal each other on a plane including this imaginary axis, this imaginary axis is designated as a rotary axis A.

Similarly, a line connected between the middle point between the piezoelectric element 31 and the piezoelectric element 34 and the middle point between the piezoelectric element 32 and the piezoelectric element 33 is named as an imaginary axis. As the length of perpendicular let fall from the piezoelectric element 31 toward the imaginary axis, the length of perpendicular let fall from the piezoelectric element 32 toward the imaginary axis, the length of perpendicular let fall from the piezoelectric element 33 toward the imaginary axis, and the length of perpendicular let fall from the piezoelectric element 34 toward the imaginary axis are equal each other on a plane including this imaginary axis, this imaginary axis is designated as a rotary axis B.

That is to say, the lines from which the distances to each piezoelectric element are equal each other, among the lines connected between the middle points of lines connected between adjacent piezoelectric elements, are the rotary axes A and B. And, as these rotary axes cross each other at one point, the control range becomes symmetrical to any rotary axis. Further, in this case, as the center of the semitransparent mirror 2 which is a movable mirror coincides with the cross point of the rotary axes A and B, the control range becomes point-symmetrical to the center of the movable mirror. And, the inclination angle of the second semitransparent mirror 2 is controlled by using the rotary axes A and B as respective pivots.

First, when the second semitransparent mirror 2 is to be rotated around the rotary axis A, a voltage is imposed to the piezoelectric elements so that the piezoelectric elements 31, 34 and the piezoelectric elements 32, 33 are displaced to each other by an equal distance to the reverse direction. Whereby, the second semitransparent mirror 2 is rotated around the rotary axis A so that, for example, the piezoelectric elements 31, 34 sides are moved to the backward direction of document plane, and the piezoelectric element 32 side and the piezoelectric element 33 side are moved to the frontward direction of the document plane.

Likewise, a voltage is imposed to the piezoelectric elements so that the piezoelectric elements 31, 32 and the piezoelectric elements 33, 34 are displaced to each other by an equal distance to the reverse direction around the rotary axis B. Whereby, the second semitransparent mirror 2 is rotated around the rotary axis B.

As each piezoelectric element is arranged at the position where the distance from each piezoelectric element to each rotary axis is equal each other, the stress to work on the second semitransparent mirror 2 which is used as the movable mirror, by the displacement of each piezoelectric element at the time of rotation control can be dispersed equally, and the breakage of the movable mirror by the concentration of stress can be prevented.

Further, it is favorable that the imaginary axis is located within the second semitransparent mirror, for purpose of rotation control of the second semitransparent mirror. If the imaginary axis is within the second semitransparent mirror, it is not necessary to consider the displacement in the direction parallel to the first semitransparent mirror when the second semitransparent mirror is rotated around the imaginary axis. The lateral displacement does not occur in the positional relation of the first and second semitransparent mirrors. Further, the force in the direction perpendicular to the expansion and contraction directions is not necessary. Accordingly, the control is easy.

The imaginary axis of the second semitransparent mirror is more favorably located on the surface of the first semitransparent mirror side. In this case, as the distance between the center of the first semitransparent mirror and the center of the second semitransparent mirror does not change when the second semitransparent mirror is rotated, the central wave lengths of the lights passed through the first and second semitransparent mirrors can be prevented from shifting.

The present invention is applicable to Etalons having the constitution similar to that of the Fabry-Perot tunable filter without limit.

What is claimed is:

1. A method of controlling an inclination angle of a Fabry-Perot tunable filter, the Fabry-Perot tunable filter comprising:
   a first semitransparent mirror, which is fixed;
   a second semitransparent mirror, which is movable and arranged opposite the first semitransparent mirror; and
   three or more piezoelectric elements arranged at regular intervals on the second semitransparent mirror for changing a space between the first semitransparent mirror and the second semitransparent mirror,
   the method comprising a step of rotating the second semitransparent mirror around each of plural axes, as pivotal axes,
   wherein the plural axes lie in a plane parallel to the second semitransparent mirror, and each of the plural axes is equidistant, on the plane parallel to the second semitransparent mirror, from each of the three or more piezoelectric elements along a line normal between each of the plural axes and each of the three or more piezoelectric elements.

2. The method of controlling an inclination angle of a Fabry-Perot tunable filter according to claim 1, wherein the plural imaginary axes cross at one point.

* * * * *